G. J. CARLISLE.
FLY TRAP.
APPLICATION FILED FEB. 3, 1912.
1,074,604.
Patented Oct. 7, 1913.
2 SHEETS—SHEET 2.
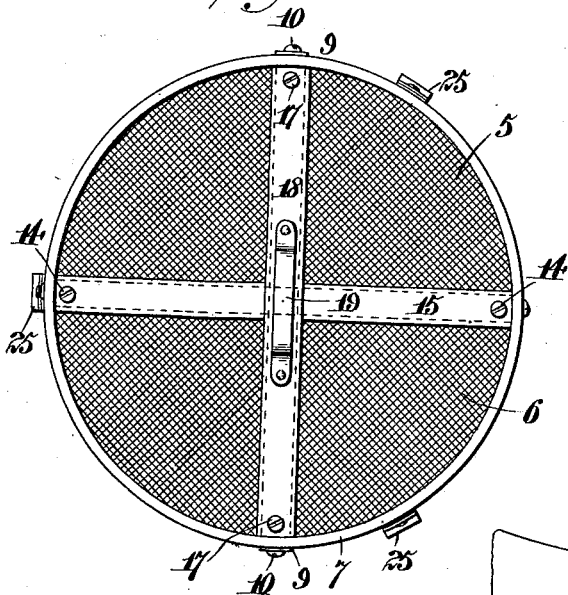
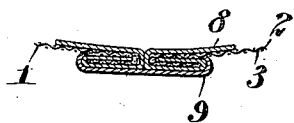
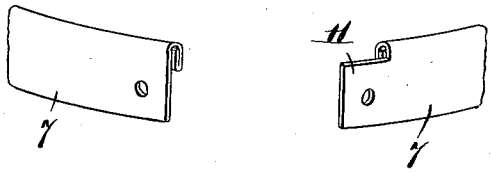
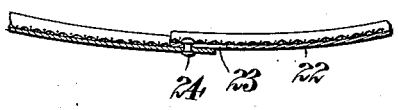
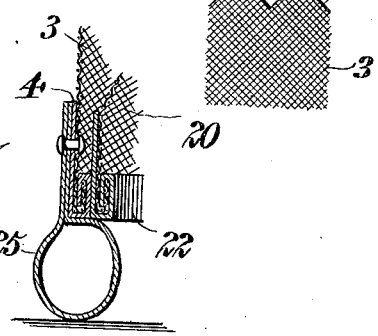
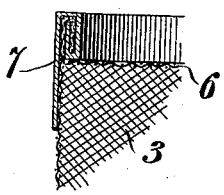
Witnesses:
Christ Feinle Jr.
C. Edwonston
Inventor,
George J. Carlisle.
By Victor J. Evans,
Attorney.

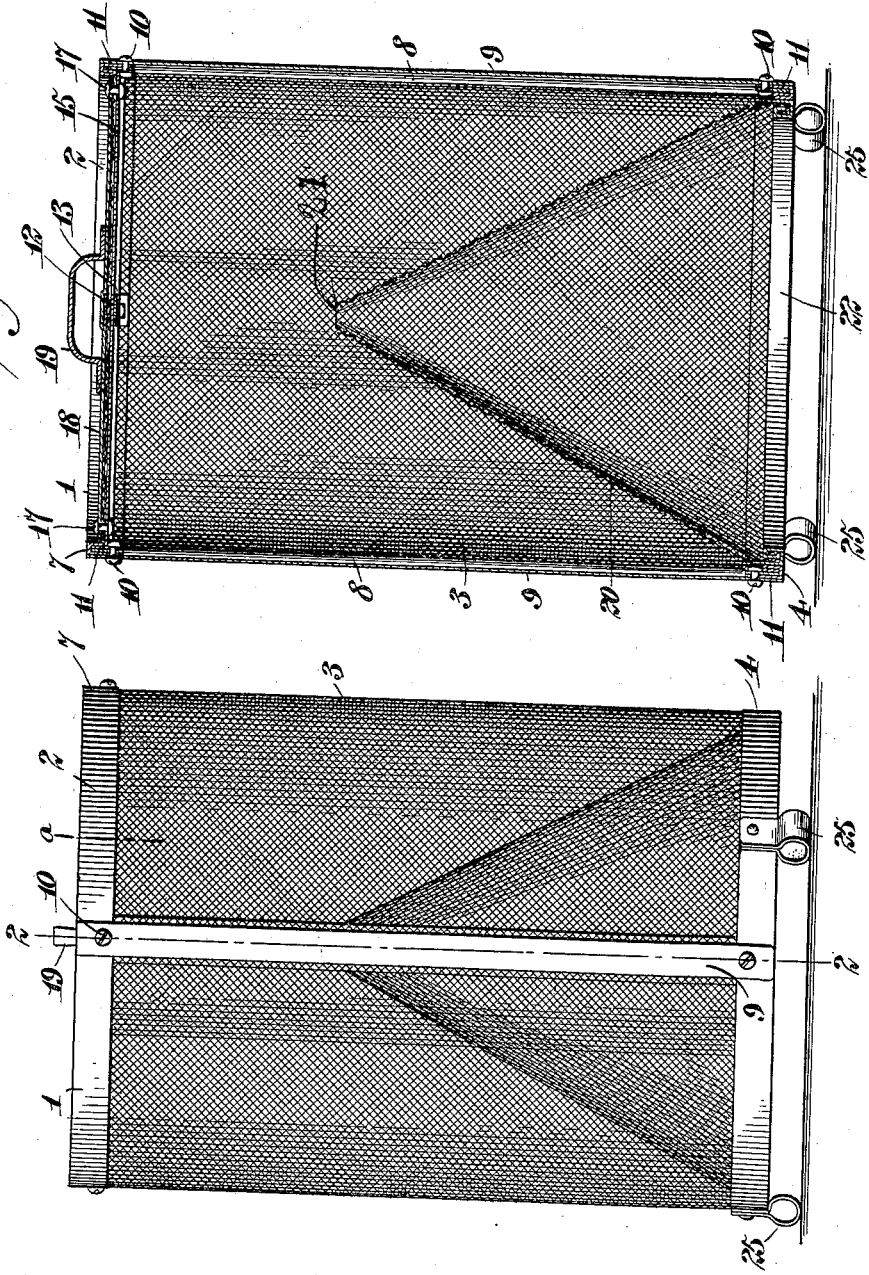

UNITED STATES PATENT OFFICE.

GEORGE J. CARLISLE, OF MUSKOGEE, OKLAHOMA, ASSIGNOR TO I X L INSU-METALLIC PRODUCTS COMPANY OF MISSOURI, OF ST. LOUIS, MISSOURI, A CORPORATION OF MISSOURI.

FLY-TRAP.

1,074,604.  Specification of Letters Patent.  Patented Oct. 7, 1913.

Application filed February 3, 1912. Serial No. 675,132.

*To all whom it may concern:*

Be it known that I, GEORGE J. CARLISLE, a native citizen of the United States, residing at Muskogee, in the county of Muskogee and State of Oklahoma, have invented new and useful Improvements in Fly-Traps, of which the following is a specification.

This invention relates to fly traps and more particularly to the construction of the same.

The object of the invention is to provide a simple and efficient device of this character wherein the separate portions may be nested together so as to occupy small space in shipment and whereby the trap may be conveniently put together and set up for operation.

A still further object of the invention is to provide a trap of this character wherein the side members are so cut as to produce a top for the device.

Further objects of this invention will appear as the following specific description is read in connection with the accompanying drawing, which forms a part of this application, and in which:—

Figure 1 is a side elevation. Fig. 2 is a vertical section on the line 2—2 of Fig. 1. Fig. 3 is a top plan view. Fig. 4 is a detail horizontal sectional view. Fig. 5 shows a perspective view of a portion of the cone base. Fig. 6 is a sectional view taken through the cone base. Fig. 7 is a detail vertical section showing the connection of the cone with the trap and how the fabric is folded therein. Fig. 8 is a detail sectional view on the line a— of Fig. 1. Fig. 9 is an elevation of one of the sheets of wire fabric used in the sections drawn on a reduced scale.

In the specific embodiment of the invention as illustrated herein, the trap is formed in two sections 1 and 2, both of which are similarly formed, the description of one sufficing for both. The trap sections 1 and 2 each consist of a sheet of wire fabric 3 which has its lower end bound by a reinforcing bottom member 4 into which the fabric is folded, as shown in Fig. 7. The top of the fabric is cut so as to form separate V-shaped extensions 5 and 6 which are bent over at right angles to the general plane of the body of the fabric and are folded into the top member 7 in a similar manner to that shown for the connection of the bottom member 4. Both of these members are then curved into semi-circular form, as shown, so that when the opposite portion 1 and 2 of the trap are connected together, as will be hereinafter described, a circular receptacle is formed, the V-shaped portions 5 and 6 having their inner edges brought together and overlapped, as shown by the dotted lines in Fig. 3, so as to form a complete circular top. The side edges of each semi-circular portion 1 or 2 are bound by a metallic strip 8 which is folded with the fabric and so arranged that when the adjoining ribs at opposite sections are placed together, a complete rib will be formed which is surrounded by a connecting strip 9 slidably mounted over the rib and connected at its upper and lower ends to the top and bottom members by means of screws 10. These screws also connect the separate top and bottom members of the different portions 1 and 2 by passing through an extension 11 which is carried by one portion and enters into the other portion, as will be hereinafter clearly understood from inspection of Fig. 5. In order to prevent separation of the top forming members 5 and 6 of these portions, suitable clamping strips or bars 12 and 13 are secured to the top by bolts 14, the former strip being arranged upon the outside and the latter strip being arranged upon the inside of the top member. Crossing the strip at right angles is a similar strip 15 which is arranged upon the inner side of the head and is connected by bolts 17 to a similar strip 18 arranged upon the outer side of the head and lying in the same general plane. This latter strip carries a suitable handle 19 by which the device may be carried from place to place.

Removably mounted within the receptacle is a foraminous cone 20 provided with a small opening 21 at its upper end and having its lower edge folded into a reinforcing and retaining band 22, one end of which is slotted as shown at 23 to receive a headed stud 24 carried by the opposite end. This reinforcing band or ring has enough inherent resiliency to normally force the ends apart so that when located in the receptacle, the same will expand, whereby the ring and the bottom members of the separate portions are brought into intimate contact. This ring or band may be collapsed and forced into the trap past supporting legs 25 which are secured to the members 4 and extend inwardly beyond the fold thereof. To collapse the ring, the ends are brought together the full length of the slot 23 and thus, the ready removal of the cone may be effected. If desirable, a bore may be formed at the upper end of the trap so as to discharge the same of its contents, but is preferable that the cone be removed each time so that the trap may be cleansed. In operation, the device is set upon a suitable support and a bait pan is set immediately beneath the cone so as to attract flies and other insects beneath the same. They will then fly or crawl upwardly through the opening 21, this opening being of very small diameter which makes it difficult and practically impossible for the flies or other insects to find the exit.

What is claimed is:—

1. A fly trap comprising a foraminous cylinder, a foraminous top therefor, and a foraminous cone mounted in the cylinder said cone having an exit opening at its top, and a resiliently expansible base member.

2. A fly trap comprising a cylindrical foraminous body, a foraminous top therefor, and inwardly extending legs secured to the base of the body and a cone mounted in the body and having a resiliently expansible base to rest upon the legs and to fit the interior of the body.

3. A fly trap comprising semi-cylindrical foraminous sections, V-shaped extensions on said sections, said V-shaped extensions being folded to form top portions, a reinforcing member for each of the sections folded with the fabric to hold the V-shaped portions in top forming position, said sections having reinforcing ribs folded with the fabric, and grooved connecting members slidably mounted upon the ribs of the sections for connecting the same together, together with a foraminous cone having a resiliently expansible base for removable engagement with the body.

In testimony whereof I affix my signature in presence of two witnesses.

GEORGE J. CARLISLE.

Witnesses:
SCOTT MITCHELL,
JOHN F. McLAIN.

Copies of this patent may be obtained for five cents each, by addressing the "Commissioner of Patents, Washington, D. C."